United States Patent

Kawasuji

[11] Patent Number: 6,131,692
[45] Date of Patent: Oct. 17, 2000

[54] ELECTRIC POWER STEERING CONTROLLER

[75] Inventor: Yasufumi Kawasuji, Hiratsuka, Japan

[73] Assignee: Komatsu Ltd., Japan

[21] Appl. No.: 09/049,874

[22] Filed: Mar. 27, 1998

[30] Foreign Application Priority Data

Mar. 28, 1997 [JP] Japan ...................... 9-078090

[51] Int. Cl.$^7$ .................................. B62D 5/04
[52] U.S. Cl. .................. 180/446; 180/443; 701/41
[58] Field of Search .................. 180/446, 433, 180/444; 701/41; 388/811, 819; 318/286

[56] References Cited

U.S. PATENT DOCUMENTS

| | | | |
|---|---|---|---|
| 5,569,991 | 10/1996 | Matsuoka et al. | 180/446 |
| 5,740,040 | 4/1998 | Kifuku et al. | 364/424.051 |
| 5,787,376 | 7/1998 | Nishino et al. | 701/41 |
| 5,881,835 | 3/1999 | Nishimoto et al. | 180/446 |
| 5,889,376 | 3/1999 | Takatsuka et al. | 318/434 |

Primary Examiner—Anne Marie Boehler
Attorney, Agent, or Firm—Greer, Burns & Crain, Ltd.

[57] ABSTRACT

An electric power steering controller which, when an assist command signal is absent or a PWM signal is off according to the assist command signal, keeps a steering wheel position without affecting on the steering operation even if an external force is applied to tires thereby improving steering operability. A switch controller 25 controls to turn on and off switches Q1 to Q4, which form an H-bridge circuit, to change a direction of a current flowing through an assist motor M1, thereby controlling to rotate the assist motor M1 and its rotating direction. For example, to rotate the assist motor M1 rightward, the switch Q4 is turned on, the switch Q1 is turned on or off according to an on-off signal of the PWM signal, and when the switch Q1 is on, a current I1 flows through the assist motor M1 to rotate it rightward. When an assist command is absent including a condition that the PWM signal is off when the assist motor M1 is rotated rightward, the switching control is performed to turn on the switches Q2 and Q4 only to form a closed circuit including the assist motor M1. Thus, the assist motor M1 is prevented from being rotated by an unexpected external force.

2 Claims, 10 Drawing Sheets

ELECTRIC POWER STEERING CONTROLLER

TECHNICAL FIELD

The invention relates to an electric power steering controller for controlling an electric power steering device having an electric motor as a drive source for a power steering to assist a force to steer an automobile, and more particularly to an electric power steering controller for stabilizing the steering operation when it is not time to assist.

BACKGROUND ART

Conventional drive control for an assist motor used for an electric power steering device has a switching circuit having an H-bridge structure and controls to turn on and off the switching circuit to apply assist torque of rightward or leftward rotation to the assist motor and to assist a steering force applied to a steering wheel.

Specifically, FIG. 8 is a diagram showing a schematic structure of a conventional electric power steering controller. It is seen that a current to be applied from a battery BT1 to an assist motor M1 is applied from a different direction by switching between switches Q11 to Q14 forming an H-bridge structure, and the assist motor M1 is rotated rightward or leftward. For driving of the assist motor M1 rightward or leftward, steering torque of a steering wheel (not shown) is detected together with its polarity by a torque sensor 81, and based on the detected steering torque, an assist command signal generating portion 82 generates an assist command signal, and a switch controlling portion 84 controls to make switching including pulse width modulation (PWM) generated by a PWM signal generating portion according to the assist command signal.

FIG. 9 and FIG. 10 show flowcharts of the switches Q11 to Q14 by conventional switching control. For example, in FIG. 9, to rotate the assist motor M1 rightward, the switch Q14 is turned on and the switch Q11 is also turned on and off by a PWM signal having a duty corresponding to the assist command signal, and a current I81 is flowing only when the switch Q11 is turned on. And, to rotate the assist motor M1 leftward, the switch Q12 is turned on and the switch Q13 is also turned on and off by a PWM signal having a duty corresponding to the assist command signal, and when the switch Q13 is turned on, a current I82 opposite from the current I81 is flowing to the assist motor M1.

On the other hand, by the switching control shown in FIG. 10, the same PWM signal is applied to the switches Q11, Q14 on a line where the current I81 flows rightward to rotate the assist motor M1 rightward, and the same PWM signal is applied to the switches Q12, Q13 on a line for the current I82 corresponding to the leftward rotation to rotate the assist motor M1 leftward.

The electric power steering controller for controlling rightward and leftward rotations of an assist motor by the switching control of the H-bridge circuit is described in, for example, Japanese Patent Publication No. 2-32185 and Japanese Utility Model Application Laid-Open No. 63-112175.

However, such a conventional electric power steering controller has disadvantages that when an assist command signal is not present, all the switches Q11 to Q14 are turned off as the suspended states shown in FIG. 9 and FIG. 10, if an external force is applied through wheels or the like to rotate the assist motor, the assist motor is readily rotated rightward or leftward by the external force because the assist motor is in an open-circuit state, and the steering wheel cannot be controlled properly. And, straight driving of an automobile at high speed is degraded, and a driver is hard to operate the steering wheel.

And, even when the assist command signal is present, it is not different from the case that there is not the assist command signal substantially if the PWM signal is off. And, tires are easy to rotate due to an external force to keep the current wheel positions, and there are the same drawbacks as those described above. The assist command signal is a signal to flow a current including an electrifying polarity to the assist motor, and the PWM signal is generated based on this signal. And, absence of the assist command signal means that the assist command signal is zero.

On the other hand, in an electric power steering controller that the assist motor is a DC series-wound motor, a shunt resistor of the assist motor is fitted to the outside of the H-bridge circuit, the respective switches of the H-bridge circuit are power semiconductor switching elements such as MOSFET (MOS-type field-effect transistor) and IGBT (insulation gate type bipolar transistor), and a flywheel diode is connected in parallel therein by its p-n junction. When there is no assist command including a PWM signal-off state and an unexpected external force is applied to the assist motor, a regenerative current is generated by a coil in the assist motor and, when a closed circuit including the assist motor is formed, then, the regenerative current continues to circulate in the closed circuit and does not flow through the shunt resistor, so that the regenerative current actually flowing through the assist motor cannot be detected. Accordingly, even if an unexpected regenerative current is flowing through the assist motor when the external force is applied to the assist motor in a state that there is not an assist command, this regenerative current cannot be detected, and feedback control at high accuracy cannot be made. As a result, the assist motor cannot be controlled with high accuracy.

SUMMARY OF THE INVENTION

The invention aims to remedy the above-described drawbacks and to provide an electric power steering controller, which can provide an improved steering operability by keeping a steering wheel position even if an external force is applied to any tires when there is no assist command signal or a PWM signal based on the assist command signal is off, without affecting on the steering operation.

A first aspect of the invention relates to an electric power steering controller which includes a permanent-magnet DC motor having first and second I/O terminals and capable of changing its direction of rotation according to a direction of a flowing current and, an H-bridge circuit having a first switch as an input side switch and a second switch as an output side switch both connected to the first I/O terminal and a third switch as an input side switch and a fourth switch as an output side switch both connected to the second I/O terminal, and which controls the driving of the DC motor including its rotating direction by controlling to turn on and off the respective switches of the H-bridge circuit to thereby assist a steering input through a steering wheel, wherein the controller comprises:

switch controlling means for controlling the switches to form a closed circuit including the DC motor within the H-bridge circuit while a current is not flowing to the DC motor.

According to the first aspect of the invention, the switch controlling means forms the closed circuit including the DC motor within the H-bridge circuit while a current is not flowing to the DC motor. If an unexpected external force is applied to rotate the DC motor rightward or leftward, the switch controlling means operates to cancel the external force to stabilize the steering operation without suffering from the external force.

A second aspect of the invention relates to the electric power steering controller set forth in claim 1, wherein:

a shunt resistor of the DC motor is connected to the outside of the H-bridge circuit;

each of the switches of the H-bridge circuit is a power semiconductor switch and has a parallel diode through which a current can be flowing by a p-n junction within the power semiconductor switch in a direction opposite to a direction of current flowing to the DC motor; and the switch controlling means turns off periodically the switch which is on at the output side of the current flowing through the DC motor which forms the closed circuit when the closed circuit is formed to return the current within the closed circuit through the parallel diode when the switch is turned off, detects a current flowing through the shunt resistor and controls the DC motor according to the detected current.

According to the second aspect of the invention, the control is carried out in such a manner that the switch whose output side for the current flowing through the DC motor forming the closed circuit being turned on is turned off periodically, the current in the closed circuit is flowing to return through the parallel diode of the switch while it is off, and the current flowing through the shunt resistor is detected, the DC motor is controlled according to the detected current. Thus, the steering operation can be stabilized without suffering from the effects of an external force.

A third aspect of the invention relates to an electric power steering controller, which includes a permanent-magnet DC motor having first and second I/O terminals and capable of changing its direction of rotation according to a direction of a flowing current and, an H-bridge circuit having a first switch as an input side switch and a second switch as an output side switch both connected to the first I/O terminal and a third switch as an input side switch and a fourth switch as an output side switch both connected to the second I/O terminal, and which controls the driving of the DC motor including its rotating direction by controlling to turn on and off the respective switches of the H-bridge circuit to thereby assist the steering input through a steering wheel, wherein the controller comprises:

switch controlling means for controlling to turn on and off the first or third switch in accordance with a pulse width modulation signal based on an assist command signal for driving the DC motor; when the pulse width modulation signal is on, controlling to turn on the corresponding fourth or second switch to make a current flow through the DC motor to rotate it in a predetermined direction and when the pulse width modulation signal is off, controlling to turn on the corresponding second or fourth switch.

According to the third aspect of the invention, the closed circuit is formed even if the pulse width modulation signal is off, and continuity is kept with or without the assist command. Thus, the steering operation can be kept stable.

BEST MODE FOR CARRYING OUT THE INVENTION

Embodiments of the invention will be described with reference to the accompanying drawings.

Figure 1:
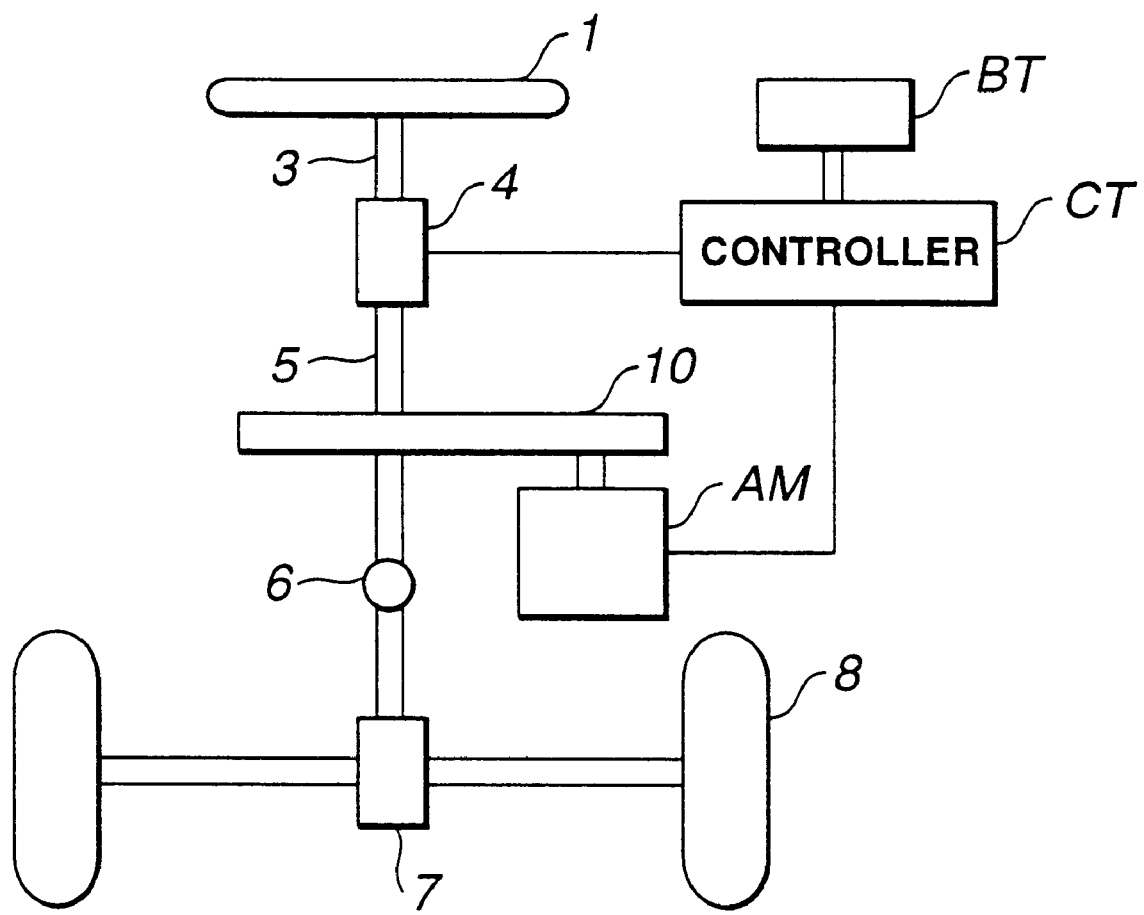
FIG. 1 is a diagram showing a schematic structure of an electric power steering mechanism according to the invention.

FIG. 1 is a diagram showing a schematic structure of an electric power steering mechanism according to the invention. In FIG. 1, a steering wheel 1 is connected to an input shaft 3 and its steering angle is entered into the input shaft 3. The input shaft 3 is connected to an output shaft 5 through a torque sensor 4. The output shaft 5 rotates a steering gear in a gear box 7 connected to an end of the output shaft 5 via a joint 6. And the steering gear rotates to change an angle of tires 8.

The torque sensor 4 converts a difference of rotation between the input shaft 3 and the output shaft 5, namely the magnitude of torsion, together with its rotating direction into an electric signal, and outputs the converted signal as a torque signal to a controller CT.

The controller CT controls the torque signal received from the torque sensor 4 and also a flowing quantity of a current from a battery BT to an assist motor AM and a rotating direction of the assist motor AM.

The assist motor AM produces torque of right or left rotation according to the control made by the controller CT to output to the output shaft 5 through a gear 10, thereby assisting the rotating force of the output shaft 5 according to a force for steering the steering wheel 1.

Figure 2:
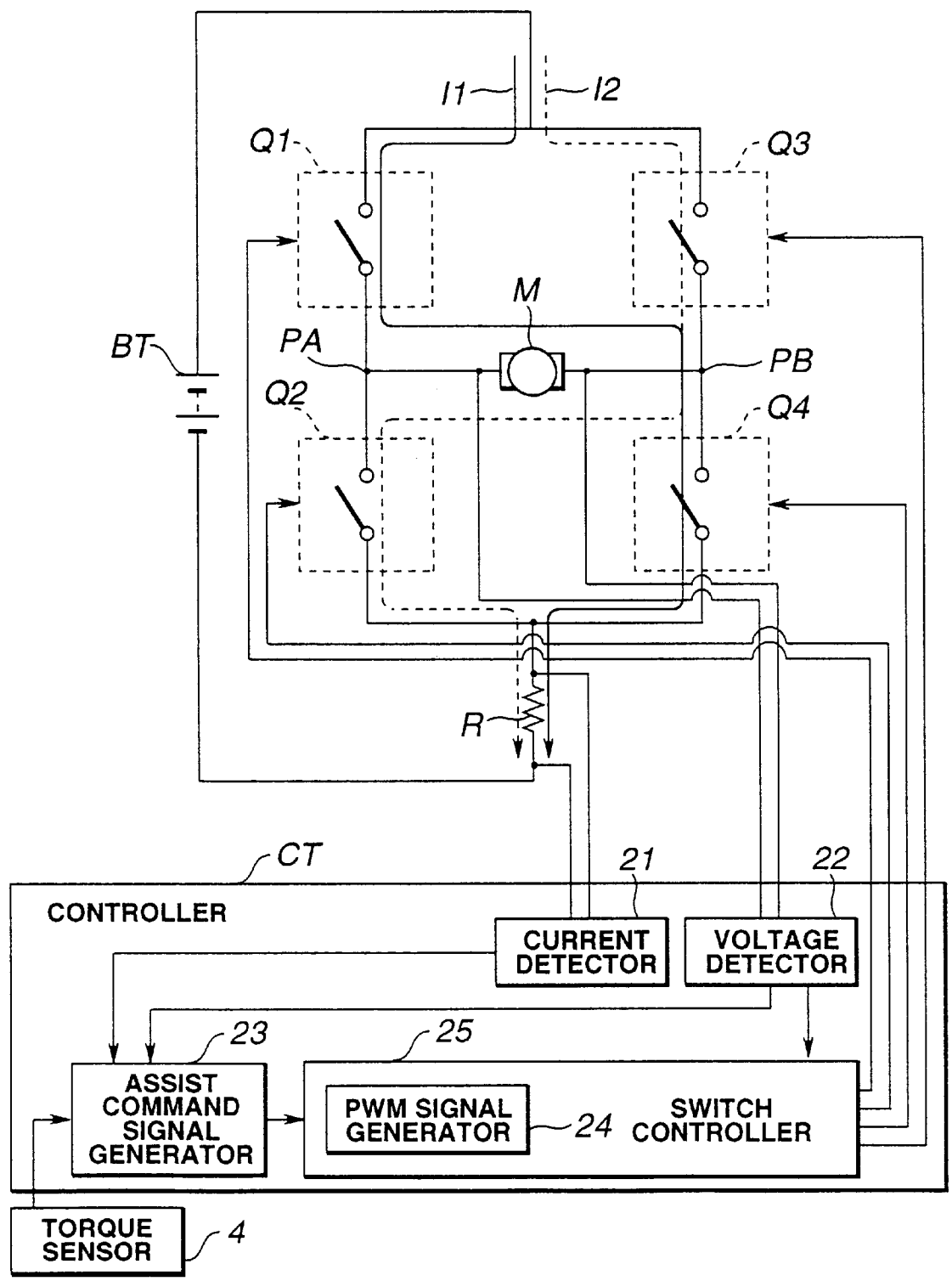
FIG. 2 is a diagram showing a configuration of the electric power steering controller of a first embodiment of the invention.

Referring to FIG. 2, the electric power steering controller of a first embodiment of the invention will be described. The electric power steering controller shown in FIG. 2 has the torque sensor 4, battery BT, controller CT and assist motor AM shown in FIG. 1.

In FIG. 2, switches Q1, Q3 are connected in parallel between the positive pole of the battery BT and point PA of the assist motor M and between the positive pole of the battery BT and point PB of the assist motor M respectively. And, switches Q2, Q4 are connected in parallel between the negative pole of the battery BT and point PA of the assist motor M and between the negative pole of the battery BT and point PB of the assist motor M respectively. In other words, there is a bridge switch circuit configuring an H-type bridge with the assist motor M at the center. A shunt resistor R of the assist motor M is connected between the bridge switch circuit and the battery BT.

The controller CT receives a torque signal from the torque sensor 4. A current detecting portion 21 in the controller CT detects the value of a current flowing through the shunt resistor R. A voltage detecting portion 22 detects the voltage across the assist motor M and also its polarity. The value of a current flowing through the assist motor M detected by the current detecting portion 21 and the value of the voltage across the assist motor M detected by the voltage detecting portion 22 are fed back to an assist command signal generating portion 23. The assist command signal generating portion 23 generates an assist command signal based on the torque signal while feeding back the current value and the voltage value. The assist command signal is output as a voltage signal corresponding to the electric value for giving desired torque to the assist motor M, and an absolute value of its amplitude value indicates the magnitude of a current. And its polarity indicates a direction of the current flowing through the assist motor M.

A PWM signal generating portion 24 of a switch controlling portion 25 compares the input assist command signal with a predetermined triangular wave signal and generates a PWM signal to allow flowing a current from the battery BT for the duration that the input assist command signal exceeds the predetermined triangular wave signal in a positive region and to allow flowing a current from the battery BT for the duration that the input assist command signal does not exceed the predetermined triangular wave signal in a negative region.

Figure 3:
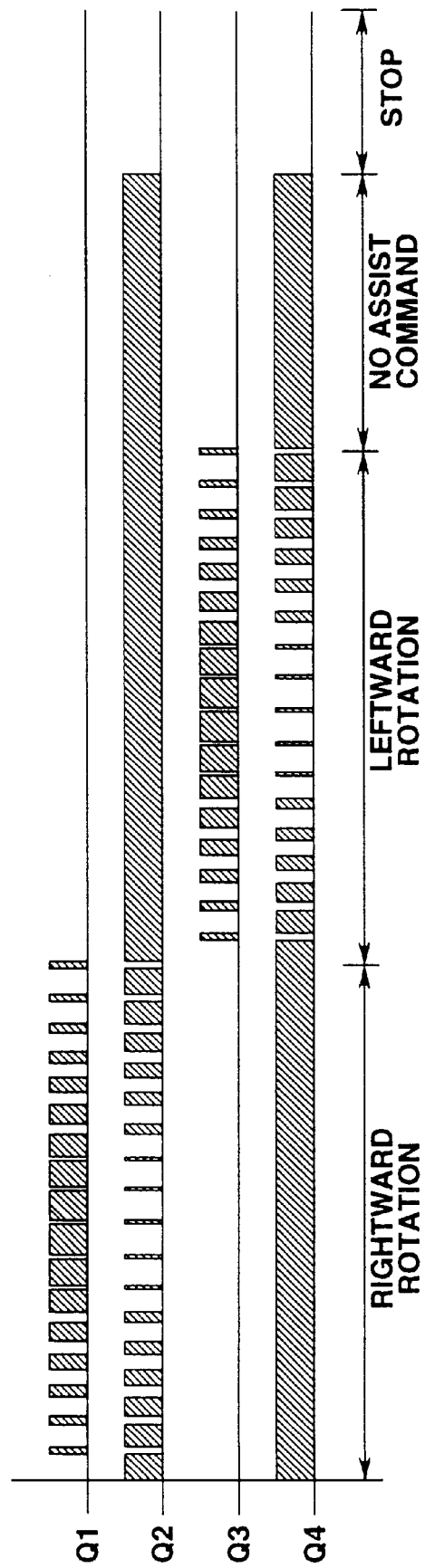
FIG. 3 is a timing chart showing on-off control by a switch controlling portion 25 for respective switches configuring an H-bridge circuit.

Referring to the timing chart of FIG. 3, on and off control of the switches Q1 to Q4 by the switch controlling portion 25 will be described.

To rotate the assist motor M rightward, the assist command signal has a positive value, and the switch Q4 is turned on to rotate the assist motor M rightward, and the on/off control based on the generated PWM signal is output to the switch Q1. Thus, when the PWM signal is on, both switches Q1, Q4 are turned on, a current I1 flows from the battery BT through the switch Q1, the assist motor M, and the switch Q4 to rotate the motor M rightward. When the PWM signal is off, on the other hand, the switch Q4 is on but the switch Q1 is off. And, the current I1 does not flow. At this time, the switch controlling portion 25 turns on the switch Q2 to have a closed circuit containing the assist motor M, namely a closed circuit comprising the assist motor M, the switch Q4, the switch Q2, and the assist motor M.

Specifically, to rotate the assist motor M rightward when the switches Q2, Q4 are on, the switch Q1 is turned on while the switch Q2 is turned off when the PWM signal is on, and the switch Q1 is turned off and the switch Q1 is turned on when the PWM signal is off.

To rotate the assist motor M leftward, the assist command signal has a negative value. And, when the assist motor M is rotated leftward, the switch Q2 is turned on, and the on/off control based on the generated PWM signal is output to the switch Q3. Then, when the PWM signal is on, both switches Q2, Q3 are turned on, and a current I2 flows from the battery BT through the switch Q3, the assist motor M, and the switch Q2 to rotate the assist motor M leftward.

When the PWM signal is off, the switch Q2 is on, but the current I2 does not flow because the switch Q3 is off. Then, the switch controlling portion 25 turns on the switch Q4 to form a closed circuit containing the assist motor M. In other words, the closed circuit of the assist motor M, the switch Q4, the switch Q2 and the assist motor M is formed.

When the closed circuit is formed, both currents I1, I2 do not flow, and since the assist motor M forms the closed circuit, even if torque to rotate the assist motor M rightward or leftward is applied by an external force from the tires 8 or the like, a resistance acts to counteract the rightward or leftward rotation of the motor M to keep the current tire position.

The same is applicable even when the relations between the switches Q1, Q3 and the switches Q2, Q4 is reversed. A closed circuit formed in this case consists of the assist motor M, the switch Q3, the switch Q1 and the assist motor M.

When there is not an assist command signal, namely a PWM signal is not generated and the assist command signal is zero, both switches Q2, Q4 keep the on position.

Accordingly, for example, a high-speed running vehicle often has a state free from an assist command signal, and a closed circuit is formed at all times in such a case. And, if tires run over pebbles to receive an unexpected external force, causing the assist motor M to rotate. But, the assist motor M does not rotate but the vehicle is kept running straight, and the steering operation is stabilized without suffering from any effect.

Figure 4:
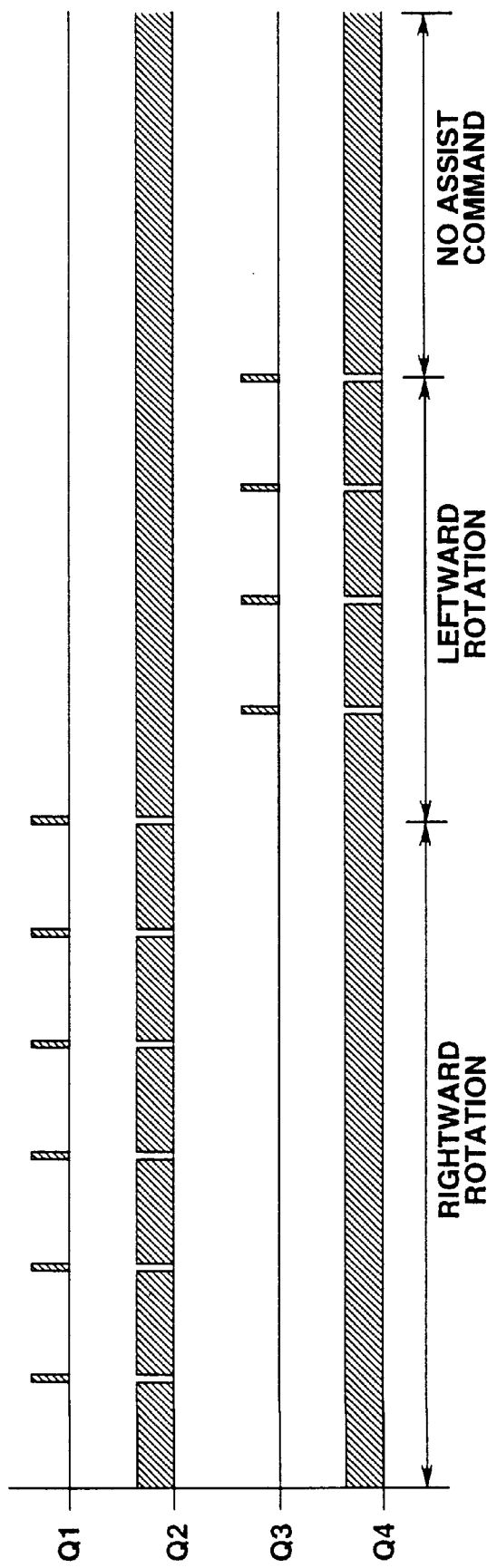
FIG. 4 is a timing chart showing on-off control by a switch controlling portion 25 for respective switches in case that an assist command signal is very weak.

It is seen in FIG. 4 that when the PWM signal corresponding to the assist command signal is on for a while, namely the PWM signal with a very small duty is sometimes on, but since the closed circuit is formed when the PWM signal is off and the assist command signal is nil, the stable steering operation can be made without being affected by the external force. Besides, the stable steering operation can be made regardless of the presence or not of the assist command signal.

A second embodiment of the invention will be described.

Figure 5:
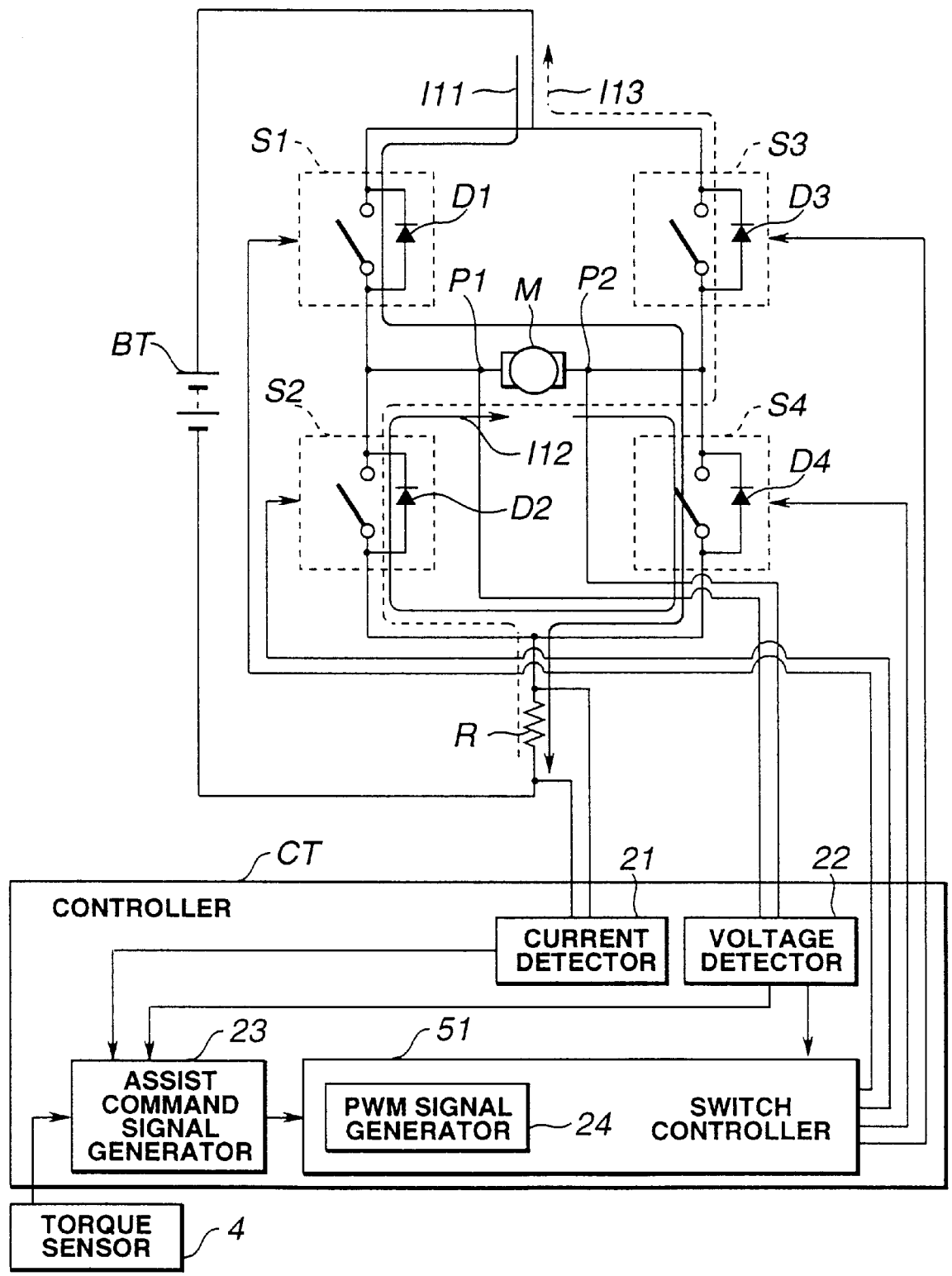
FIG. 5 is a diagram showing a configuration of the electric power steering controller of a second embodiment of the invention.

FIG. 5 is a diagram showing a configuration of an electric power steering controller of the second embodiment of the invention. Differences from the electric power steering controller shown in FIG. 1 include that switches S1 to S4 as power semiconductor switching elements are used instead of the switches Q1 to Q4, and a switch controlling portion 51 corresponding to the switch controlling portion 25 has different controlling operation.

The switches S1 to S4 are power semiconductor switching elements such as MOSFET and IGBT, and have flywheel diodes D1 to D4 connected in parallel by an internal p-n junction.

In the same manner as the switch controlling portion 25, for example to rotate the assist motor M rightward, the switch controlling portion 51 controls to output, according to the assist command signal, a PWM signal to the switch S1 from a state that the switches S2, S4 are on, to turn on the switch S1 and off the switch S2 when the PWM signal is on with the switch S2 kept on to flow a current I11, and to turn on the switch S2 and off the switch S1 when the PWM signal is off.

When both switches S2, S4 are on, a closed circuit is formed of the assist motor M, the switch S4, the switch S2, and the assist motor M, and if an external force is applied to rotate the assist motor M, a regenerative current is produced in the assist motor M and keeps circulating in a closed circuit because the assist motor M forms the closed circuit. Besides, since a shunt resistor R is disposed outside of an H-type bridge circuit consisting of the switches S1 to S4 containing the closed circuit,. it cannot detect the regenerative current.

It is to be understood that when a current is flowing to rotate the assist motor M rightward or leftward, the current flowing through the assist motor M can be detected because the current also flows through the shunt resistor R. In other words, the current may flow as a regenerative current through the assist motor M when the current is not flowing through the assist motor M. And, if this regenerative current can be detected, it can be used to make feedback control, and in addition to the resistance of the closed circuit itself to cancel the rotation of the assist motor M, stable steering operation not affected by an external force can be obtained.

If an assist command signal containing a case that a PWM signal is off is absent, the switch controlling portion 51 controls to flow a regenerative current within the closed circuit to the shunt resistor R periodically based on the polarity of the voltage across the assist motor M detected by the voltage detecting portion 22 and feeds back the value of the regenerative current detected by the current detecting portion 21 to eliminate the regenerative current.

Figure 6:
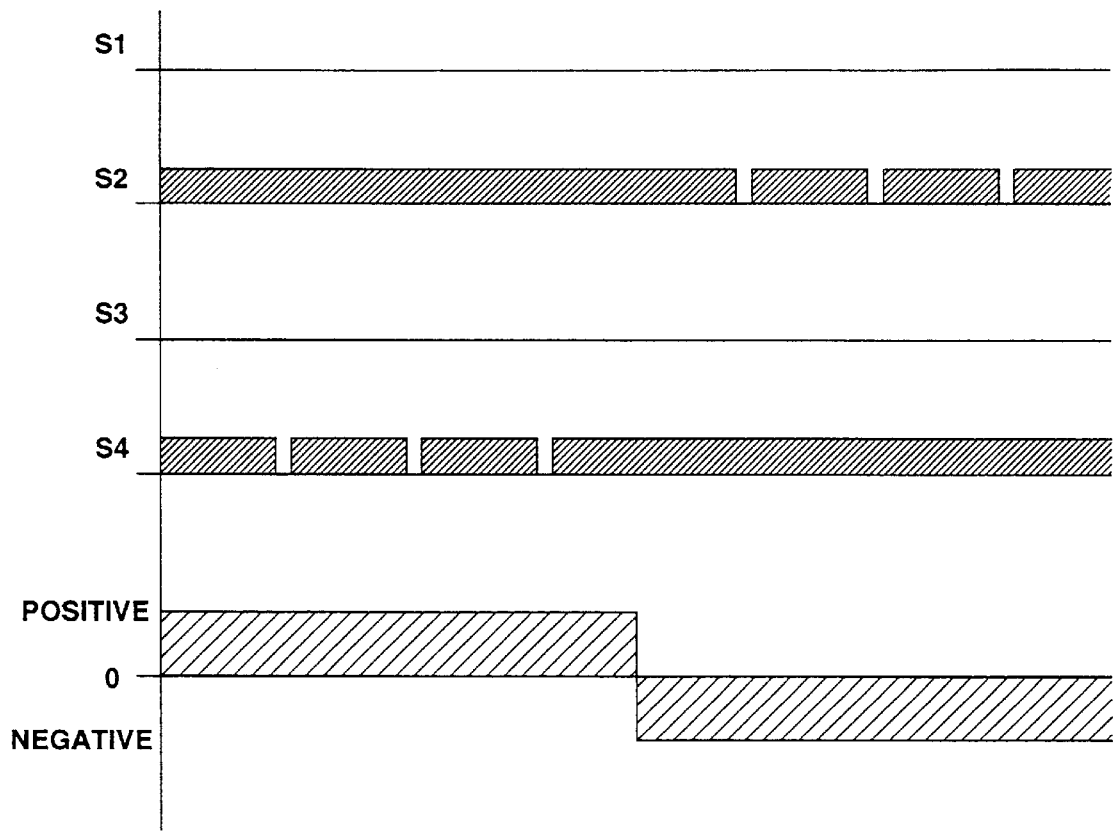
FIG. 6 is a timing chart showing on-off control of respective switches made by a switch controlling portion 51 to detect a regenerative current if an assist command signal is not given.

Referring to the timing chart of FIG. 6, the control and action of the switch controlling portion 51 will be described. Since this control is made when there is a closed circuit formed, the switches S2, S4 are on. In this state, the voltage detecting portion 22 detects the voltage across the assist motor M, and particularly outputs the polarity of the voltage to the switch controlling portion 51. And, the polarity of the voltage at point P2 when viewed from point P1 is output to the switch controlling portion 51. When the detected voltage has a positive polarity, the switch controlling portion 51 turns off the switch S4 periodically from the state that the switches S2, S4 are on because the current flowing through the closed circuit formed by the switches S2, S4 is rightward. Though only the switch S2 forming the H-type bridge circuit is on, the switch S3, which is off, has the flywheel diode D3, and the regenerative current circulating within the closed circuit flows to return to the battery BT through the flywheel diode D3. Therefore, a current I13 also flows through the shunt resistor R, and the current detecting portion 21 can detect the current I13. Thus, an unexpected regenerative current circulating within the closed circuit can be detected, and it is controlled to cancel the regenerative current, namely the effect of the external force to the assist motor M.

Similarly, when the voltage detected by the voltage detecting portion 22 has a negative polarity, the regenerative current flowing within the closed circuit is leftward, and the switch S2 is turned off periodically. Upon turning off the switch S2, the regenerative current flows to return to the battery BT through the switch S4, the assist motor M and the flywheel diode D1 of the switch S1, and the current detecting portion 21 detects the current flowing through the shunt resistor R. And, the switch controlling portion 51 controls to cancel the regenerative current according to the detected regenerative current.

Figure 7:
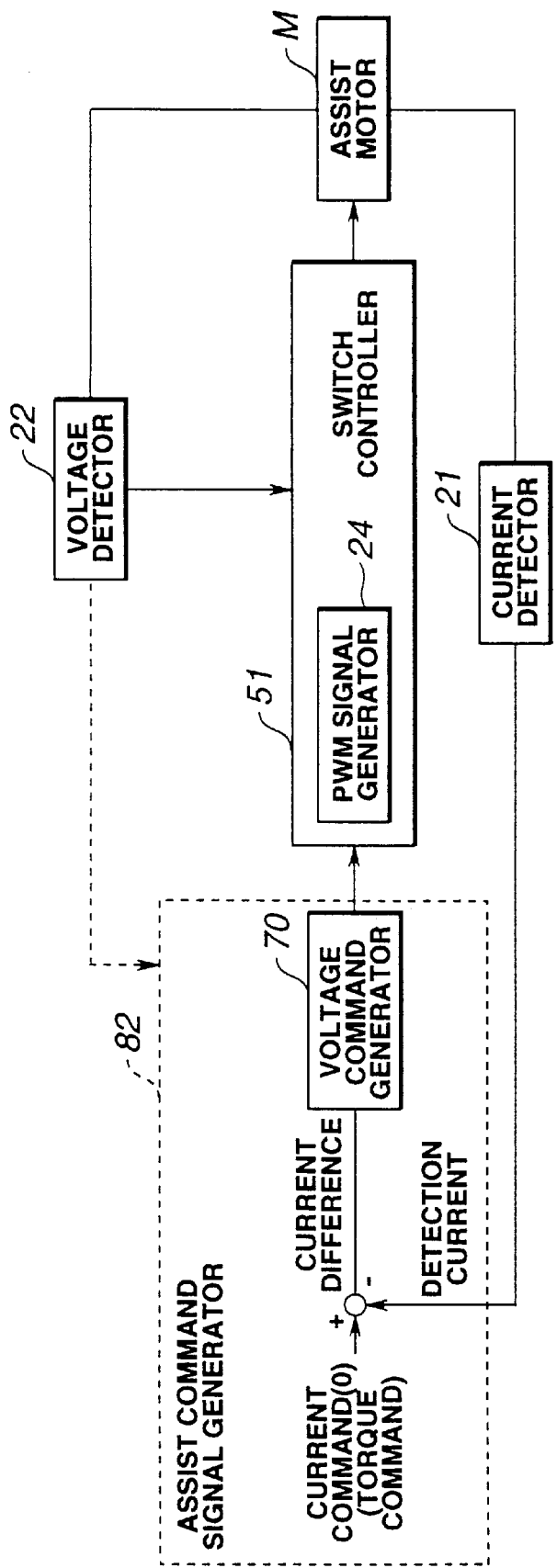
FIG. 7 is a diagram schematically showing feedback control based on a regenerative current.
Figure 8:
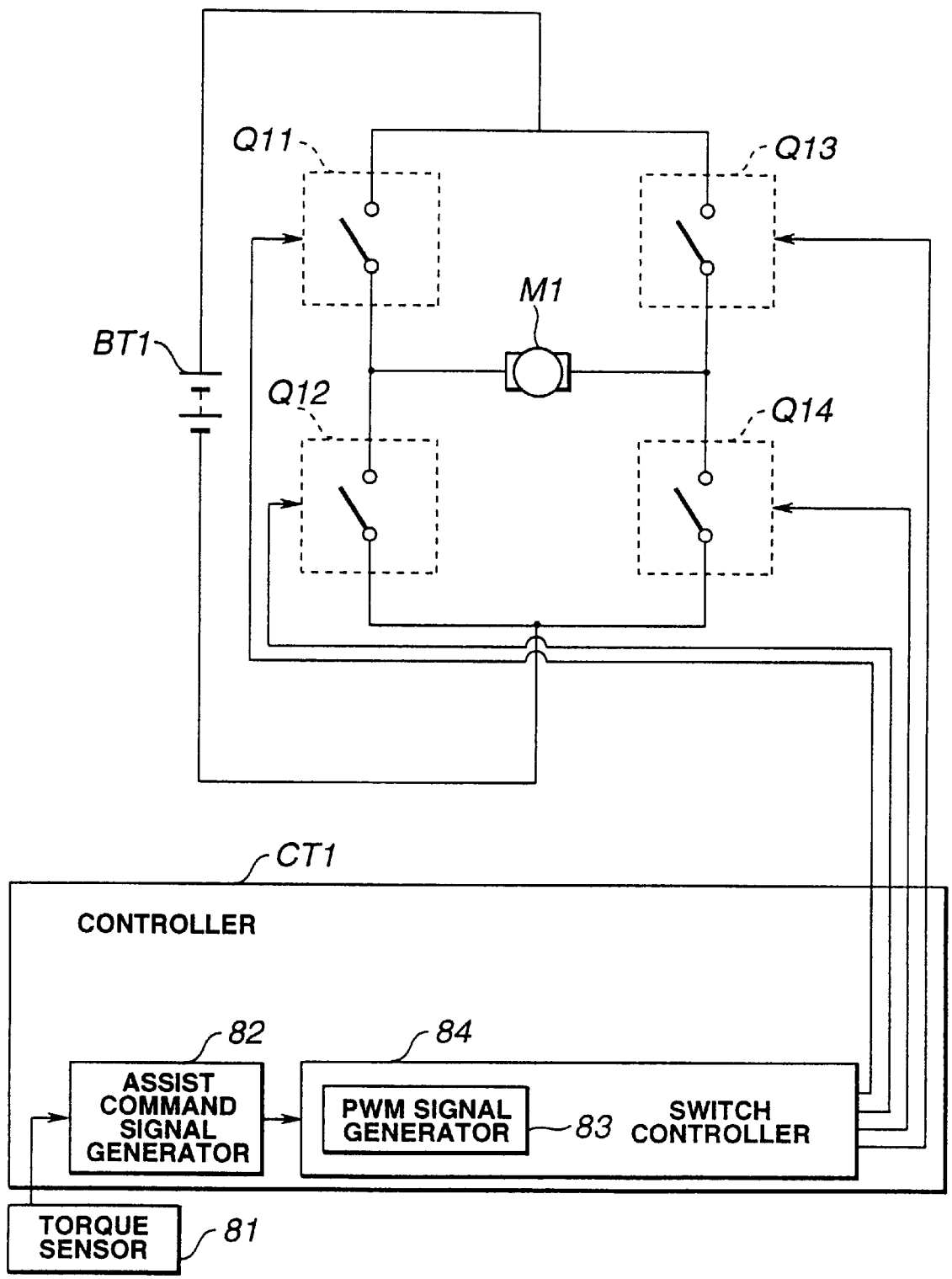
FIG. 8 is a diagram showing a schematic structure of a conventional electric power steering controller.
Figure 9:
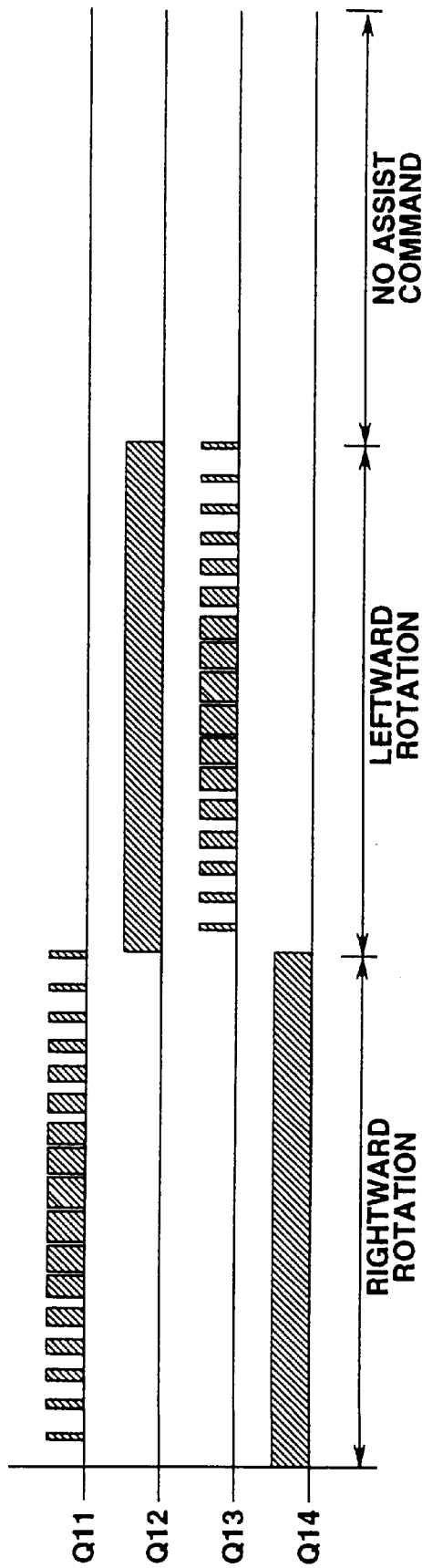
FIG. 9 is a timing chart showing switching control of respective switches configuring an H-bridge circuit.
Figure 10:
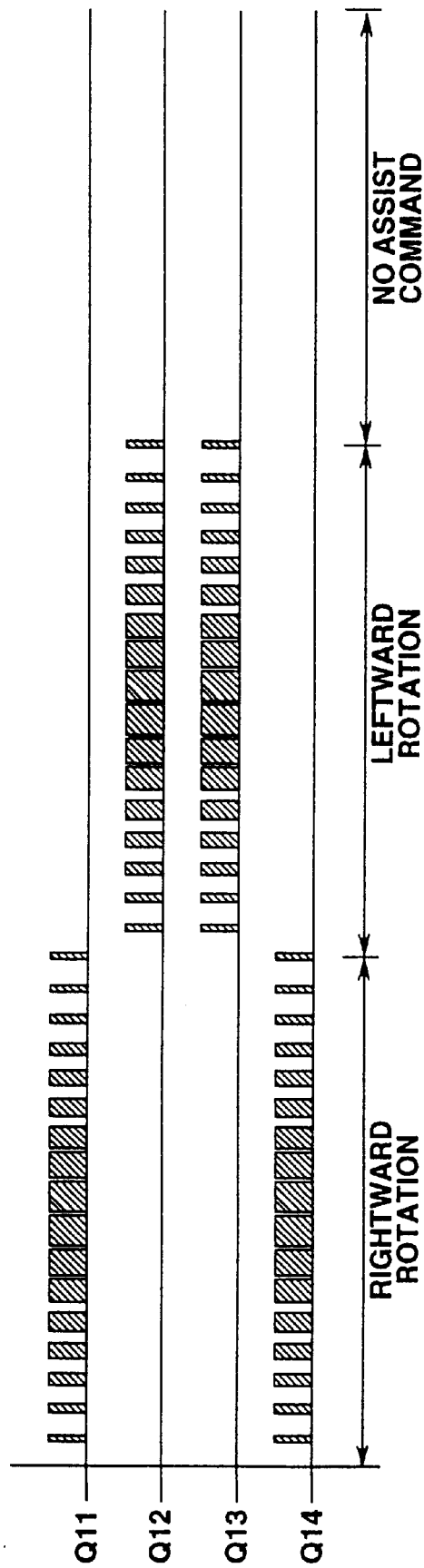
FIG. 10 is a timing chart showing switching control of respective switches configuring an H-bridge circuit.

Referring to FIG. 7, the feedback control of the regenerative current will be described. FIG. 7 shows a part of the detailed configuration of a controller CT1 related to the feedback control of the regenerative current. The voltage detecting portion 22 detects at least the voltage across the assist motor M. And, the detected polarity of the voltage is input to the switch controlling portion 51. Based on the input polarity of the voltage, the switch controlling portion 51 turns off the corresponding switch periodically as shown in FIG. 6 to have the regenerative current within the closed circuit detected by the current detecting portion 21 through the shunt resistor R. The value of the regenerative current detected by the current detecting portion 21 is input to a voltage command (corresponding to a final assist command) generating portion 70 as a current error signal for a difference from the current command as a torque command, and a voltage command is generated, but its value is nil. In other words, it is zero, and the value of the detected regenerative current is input as a negative current value to the voltage command generating portion 70, and a corresponding voltage command is generated. Then, a PWM signal corresponding to the voltage command is generated, and the switch controlling portion 51 makes the switching control to cancel the regenerative current. At the same time, the rightward or leftward rotation of the assist motor M is switched under control according to the polarity of the voltage being input from the voltage detecting portion 22. Specifically, when the regenerative current flowing through the assist motor M is rightward, the switching control is made to flow the current for leftward rotation through the assist motor M, a negative current value is detected by the current detecting portion 21 and a current error is also detected, thereby matching with positive and negative changes taken into account.

As described above, when an assist command signal is not present, namely the value of a current command based on a torque signal is zero, a regenerative current owing to an unexpected external force is detected, and feedback control is made to cancel the unexpected external force. And, in addition to the formation of the closed circuit described above, the steering operation can be improved.

What is claimed is:

1. An electric power steering controller which includes a permanent-magnet DC motor having first and second I/O terminals and capable of changing its direction of rotation according to a direction of a flowing current and, an H-bridge circuit having a first switch as an input side switch and a second switch as an output side switch both connected to the first I/O terminal and a third switch as an input side switch and a fourth switch as an output side switch both connected to the second I/O terminal, and which controls the driving of the DC motor including its rotating direction by controlling to turn on and off the respective switches of the H-bridge circuit to thereby assist a steering input through a steering wheel, wherein the controller comprises:

switch controlling means for controlling the switches to form a closed circuit including the DC motor within the H-bridge circuit while a current is not flowing to the DC motor.

2. The electric power steering controller as set forth in claim 1, wherein:

a shunt resistor of the DC motor is connected to outside of the H-bridge circuit;

each of the switches of the H-bridge circuit is a power semiconductor switch and has a parallel diode through which a current can be flowing by a p-n junction within the power semiconductor switch in a direction opposite to a direction of current flown to the DC motor; and the switch controlling means turns off periodically the switch which is on at the output side of the current flowing through the DC motor which forms the closed circuit when the closed circuit is formed to return the current within the closed circuit through the parallel diode when the switch is turned off, detects a current flowing through the shunt resistor and controls the DC motor according to the detected current.

* * * * *